United States Patent
Matsuzawa

(10) Patent No.: US 11,514,937 B1
(45) Date of Patent: Nov. 29, 2022

(54) MAGNETIC DISK DEVICE AND METHOD OF REDUCING MICROACTUATOR VOLTAGE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuji Matsuzawa, Kashiwa Chiba (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/580,350

(22) Filed: Jan. 20, 2022

(30) Foreign Application Priority Data

Aug. 25, 2021 (JP) .............................. JP2021-137245

(51) Int. Cl.
*G11B 5/596* (2006.01)
*G11B 5/48* (2006.01)
*G11B 5/55* (2006.01)
*G11B 21/10* (2006.01)

(52) U.S. Cl.
CPC .......... *G11B 5/4873* (2013.01); *G11B 5/5547* (2013.01); *G11B 5/5552* (2013.01); *G11B 5/5556* (2013.01); *G11B 5/596* (2013.01); *G11B 21/106* (2013.01)

(58) Field of Classification Search
None
See application file for complete search history.

(56) References Cited

U.S. PATENT DOCUMENTS 6,693,763 B2  2/2004  Bi et al.
2013/0135769 A1  5/2013  Higa et al.

FOREIGN PATENT DOCUMENTS

JP  2001-006305 A  1/2001

*Primary Examiner* — Craig A. Renner
(74) *Attorney, Agent, or Firm* — Kim & Stewart LLP

(57) ABSTRACT

According to one embodiment, when adjusting a position of a magnetic head by a microactuator, in a case where a difference of an absolute value of a first voltage value obtained by correcting a voltage value applied to the microactuator based on hysteresis and an absolute value of a second voltage value obtained by not correcting the voltage value applied to the microactuator based on the hysteresis is positive, a control unit applies a third voltage value obtained based on the second voltage value to the microactuator, and adjusts shortage of the adjustment executed by the microactuator by controlling at least one of a voice coil motor and/or a microactuator other than a microactuator applying a third voltage value.

7 Claims, 6 Drawing Sheets

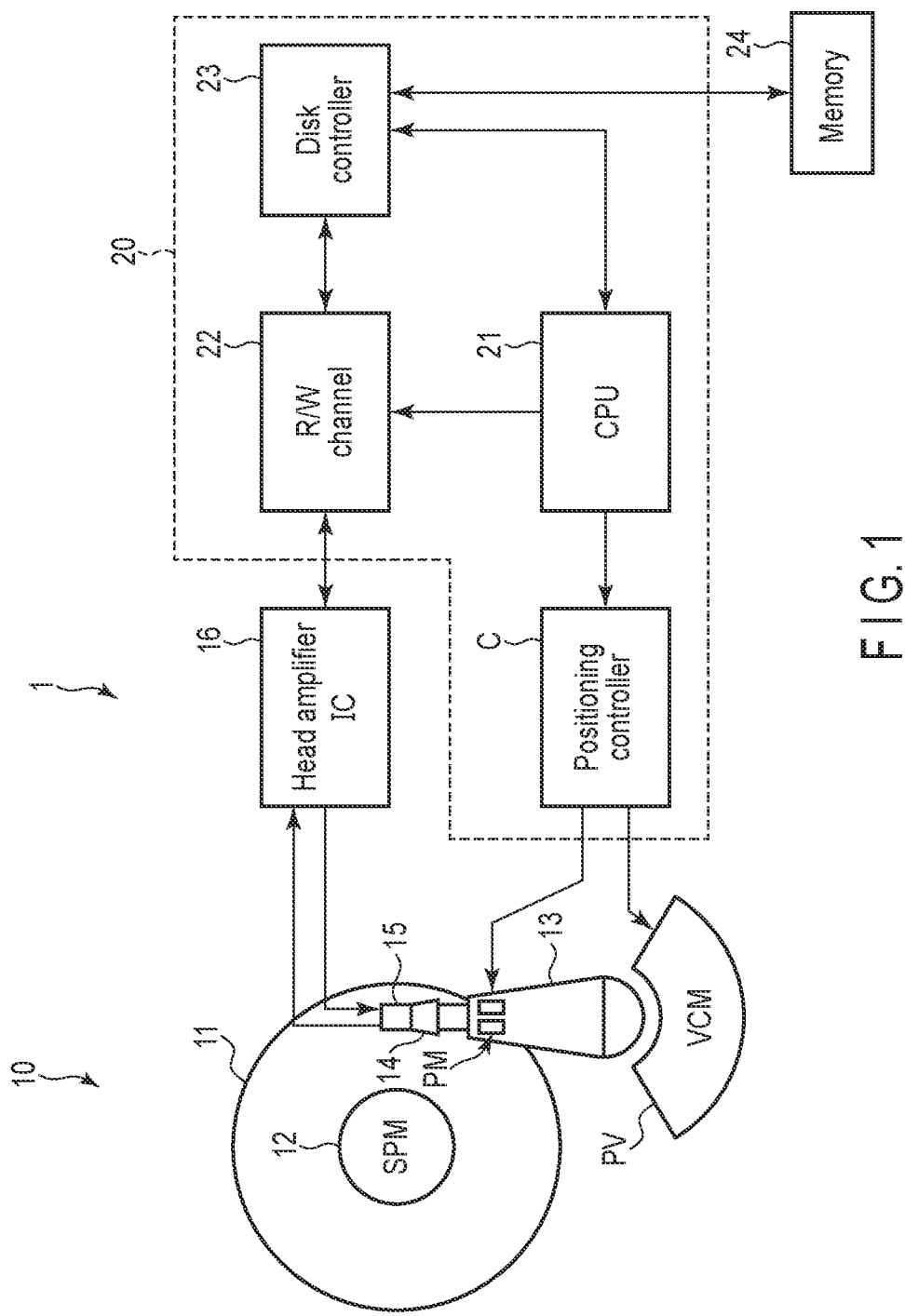
F I G. 1

MAGNETIC DISK DEVICE AND METHOD OF REDUCING MICROACTUATOR VOLTAGE

CROSS-REFERENCE TO RELATED APPLICATIONS

This application is based upon and claims the benefit of priority from Japanese Patent Application No. 2021-137245, filed Aug. 25, 2021, the entire contents of which are incorporated herein by reference.

FIELD

Embodiments described herein relate generally to a magnetic disk device and a control method.

BACKGROUND

A magnetic disk device equipped with what is called a microactuator is known. This type of magnetic disk device can finely adjust the position of the magnetic head to the magnetic disk and improve the positioning accuracy, by controlling the microactuator.

Incidentally, some of the microactuators have hysteresis. Since displacement occurring when a voltage is applied to the microactuator depends on a past voltage history for the hysteresis, for example, non-linearity in a case of increasing the voltage of the microactuator and non-linearity in a case of reducing the voltage indicate different characteristics. When the microactuator has such hysteresis, it may be required to correct the voltage value applied to the microactuator in consideration of the hysteresis. When the hysteresis is compensated, however, a voltage having a high absolute value may be applied to the microactuator as compared with a case where the microactuator has no hysteresis. Applying a voltage having a high absolute value to the microactuator may cause deterioration of an element constituting the microactuator.

Embodiments described herein aim to provide a magnetic disk device and a control method capable of preventing deterioration of elements in the microactuator.

BRIEF DESCRIPTION OF THE DRAWINGS

FIG. 1 is a block diagram showing an example of a configuration of a magnetic disk device according to an embodiment.

DETAILED DESCRIPTION

Figure 2:
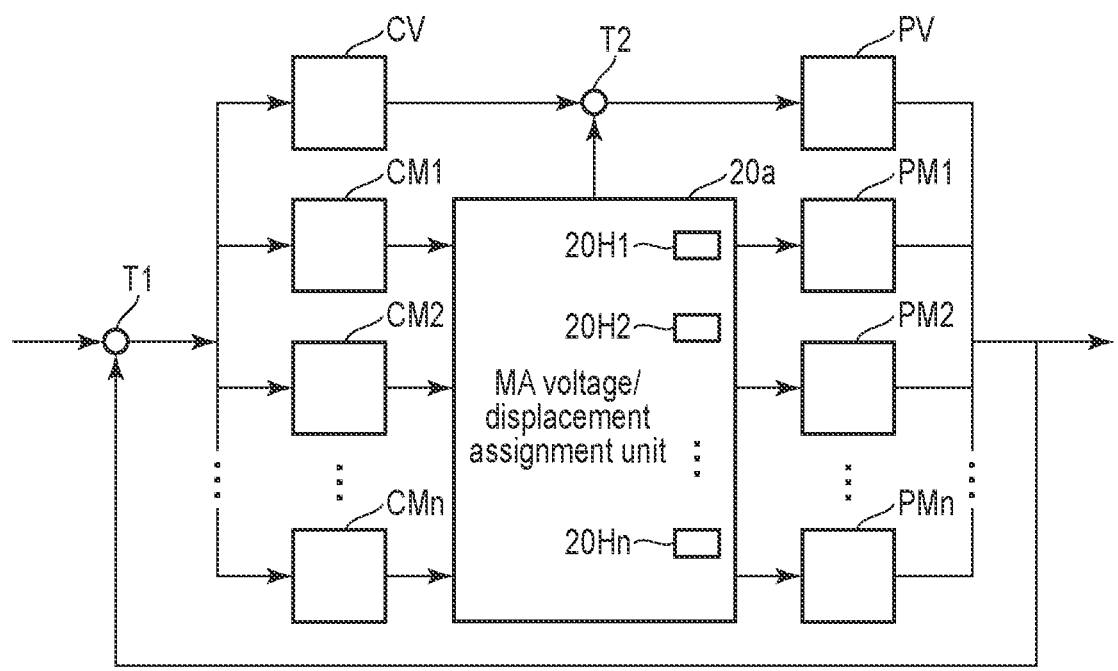
FIG. 2 is a diagram showing an example of control configuration of the magnetic disk device comprising a plurality of actuators according to the embodiment.

In general, according to one embodiment, a magnetic disk device comprises a magnetic disk, a magnetic head, a voice coil motor, a plurality of microactuators, and a control unit. The voice coil motor operates the magnetic head at a predetermined position on the magnetic disk. The plurality of microactuators provided for the magnetic head adjust the position of the magnetic head. The control unit controls a motion of the voice coil motor and displacements of the plurality of microactuators. When adjusting the position of the magnetic head by a first microactuator that is one of the plurality of microactuators, in a case where a difference of an absolute value of a first voltage value obtained by correcting a voltage value applied to the first microactuator based on hysteresis and an absolute value of a second voltage value obtained by not correcting the voltage value applied to the first microactuator based on the hysteresis is positive, the control unit applies a third voltage value obtained based on the second voltage value to the first microactuator, and adjusts shortage of the adjustment executed by the first microactuator by controlling at least one of the voice coil motor and/or a second microactuator other than the first microactuator.

FIG. 1 is a block diagram showing an example of a configuration of a magnetic disk device 1.

The magnetic disk device 1 is composed of a head-disk assembly (HDA) 10, a head amplifier integrated circuit (hereinafter referred to as a head amplifier IC) 16, and a system on chip (SOC) 20.

The HDA 10 includes a magnetic disk 11, a spindle motor (SPM) 12, an arm 13, and a voice coil motor (VCM) PV. The magnetic disk 11 is rotated by the spindle motor 12. A load beam 14 is attached to a distal end of the arm 13, and a magnetic head 15 is attached to a distal end of the load beam 14. The arm 13 controls the magnetic head 15 to move to a designated position on the magnetic disk 11 by the drive of the voice coil motor PV. Furthermore, a microactuator is a pair of piezoelectric elements (for example, Pb(Zr,Ti)O3) and is arranged in the vicinity of an attachment part of the load beam 14 at the distal end part of the arm 13. The right and left piezoelectric elements expand and contract in opposition by applying voltages to the pair of piezoelectric elements, and the position of the magnetic head 15 is adjusted in a radial direction of the magnetic disk 11 on the magnetic disk 11 by adjusting the magnetic head 15 at the distal end of the load beam 14 in the radial direction (cross-track direction) on the magnetic disk 11. Thus, the magnetic disk device 1 includes the voice coil motor PV and the microactuators PM as a plurality of actuators for the positioning of the magnetic head 15. Alternatively, the microactuators PM may be arranged on the magnetic head 15. A plurality of microactuators PM may be arranged on the arm 13, the load beam 14, and the magnetic head 15, for one magnetic head 15.

The magnetic head 15 has a structure that a read head element and a write head element are separated and mounted on one slider. The read head element reads data recorded in the magnetic disk 11. The write head element writes data to the magnetic disk 11.

The head amplifier IC 16 includes a read amplifier and a write driver. The read amplifier amplifies a read signal read by the read head element and transmits the read signal to a read/write (R/W) channel 22. In contrast, the write driver transmits a write current depending on write data output from the R/W channel 22 to the write head element.

The SOC 20 includes a microprocessor (CPU) 21, the R/W channel 22, a disk controller 23, and a positioning controller C. The CPU 21 is a main controller of the drive and performs the servo control for positioning the magnetic head 15 via the positioning controller C and the data read/write control via the head amplifier IC 16. The R/W channel 22 includes a read channel for performing the signal processing of the read data and a write channel for performing the signal processing of the write data. The disk controller 23 performs interface control for controlling data transfer between a host system (not shown) and the R/W channel 22. The positioning controller C may be implemented as hardware or may be implemented as software (firmware).

A memory 24 includes a volatile memory and a nonvolatile memory. For example, the memory 24 includes a buffer memory composed of DRAM and a flash memory. Programs and the like necessary for processing of the CPU 21 are stored in the nonvolatile memory of the memory 24.

FIG. 2 is a view showing an example of the control configuration of the magnetic disk device 1 having a plurality of actuators. In FIG. 2, the magnetic disk device 1 comprises the voice coil motor PV and microactuators PM1 to PMn as a plurality of actuators. In addition, positioning controllers C for controlling the respective actuators is provided. More specifically, the positioning controllers C are a voice coil motor controller CV for controlling the voice coil motor PV, and MA controllers CM1 to CMn for controlling the microactuators PM1 to PMn. In addition, an MA voltage/displacement assignment unit 20a serving as a control unit is provided. When the voltage applied to one of the microactuators PM is suppressed from the voltage at which the required displacement is obtained, the MA voltage/displacement assignment unit 20a executes a process of compensating for the shortage of the displacement by other actuators. The above-described magnetic disk device shown in FIG. 1 is an example of a case where the voice coil motor PV and one of the microactuators PM are provided as a plurality of actuators. Thus, the magnetic disk device 1 may comprise the voice coil motor PV and one of the microactuators PM or comprise the voice coil motor PV and the plurality of microactuators PM1 to PMn as the plurality of actuators.

In addition, the MA voltage/displacement assignment unit 20a comprises hysteresis storage units 20H1 to 20Hn storing hysteresis of each of the microactuators PM1 to PMn. Thus, the MA voltage/displacement assignment unit 20a stores the hysteresis of each of the microactuators PM1 to PMn. The MA voltage/displacement assignment unit 20a can thereby appropriately execute the assignment of the displacement to be described later. The MA voltage/displacement assignment unit 20a is implemented by hardware in an existing chip 20, or firmware.

In FIG. 2, after having passed through a terminal T1, the input signal input from a host system (not shown) is input to the voice coil motor controller CV and the MA controllers CM1 to CMn in parallel. Then, signals are input from the MA controllers CM1 to CMn, respectively, to the MA voltage/displacement assignment unit 20a. When determining that the first microactuator PM1 for suppressing the voltage is provided, as a result of hysteresis compensation, based on the signals thus input from the MA controllers CM1 to CMn, the MA voltage/displacement assignment unit 20a assigns the current and/or voltage for controlling the voice coil motor PV and/or the second microactuator other than the first microactuator PM1 to adjust the shortage of the displacement that results from suppressing the voltage. Thus, the signal indicating the assigned current is input to the voice coil motor PV via a terminal T2 and/or the signal indicating the assigned voltage is input to the microactuator PM1 to the microactuator PMn. Therefore, when suppressing the voltage applied to the first microactuator PM1 based on the hysteresis compensation, the magnetic disk device 1 can supplement the shortage of the displacement of the actuator by the other actuator. The signals output from the voice coil motor controller CV and the MA controllers CM1 to CMn are fed back to the terminal T1. Correction of the error to the positioning is thereby executed.

The hysteresis of the microactuators PM will be described.

The microactuators PM have the hysteresis as described above. For this reason, a process of compensating the hysteresis by using the hysteresis model or using approximation is executed to improve the positioning accuracy of the microactuators PM.

Figure 3:
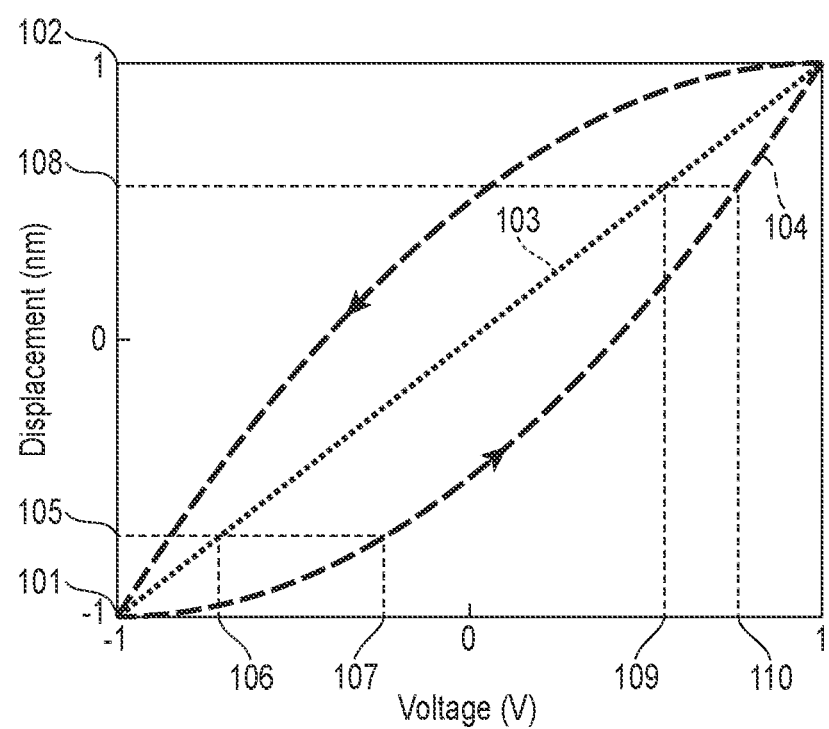
FIG. 3 is a graph showing an example of hysteresis according to the embodiment.

FIG. 3 is a graph showing an example of the hysteresis of one of the microactuators PM (herein after PMx). In FIG. 3, the horizontal axis refers to a voltage applied to the microactuator PMx (also hereinafter referred to as an MA voltage), and the vertical axis refers to the displacement of the microactuator PMx (also hereinafter referred to as the MA displacement).

Change of MA displacement 101 to 102 in the microactuator PMx having hysteresis 104 shown in the FIG. 3 will be considered. A relationship between the MA voltage and the MA displacement become linear like 103 when the microactuator PMx has no hysteresis, and becomes nonlinear like 104 when the microactuator PMx has the hysteresis. In the following descriptions, the MA voltage obtained after the hysteresis compensation is referred to as a first MA voltage value (first voltage value), and the MA voltage on the assumption that the microactuator PMx does not have the hysteresis is referred to as a second MA voltage (second voltage value).

When MA displacement 105 is to be obtained, the second MA voltage value becomes 106, but the first MA voltage value becomes 107, and the absolute value of the MA voltage value becomes low. In contrast, when MA displacement 108 is to be obtained, the second MA voltage value becomes 109, but the first MA voltage value becomes 110, and the absolute value of the MA voltage value becomes high.

The microactuators PM deteriorate depending on a constructed element when a voltage of a high absolute value is applied thereto. For this reason, it is desirable to avoid the application of a voltage of a high absolute value as much as possible, as described above. When the absolute value of the MA voltage value becomes high as compared with the case where the microactuator has no hysteresis, by compensating the hysteresis, the magnetic disk device 1 of the present embodiment sets a third MA voltage value (third voltage value) within a range that the absolute value is lower than an absolute value of the second MA voltage value, and adjusts shortage of the displacement that results from such application of the third MA voltage value by controlling the other actuators, more specifically, at least any one of the voice coil motor PV and/or a microactuator other than the microactuator which applies the third MA voltage value. It is desirable that the magnetic disk device 1 assigns a voltage corresponding to the shortage of the displacement to an actuator having room for voltage or current, of actuators compensating for the shortage of the displacement. Furthermore, the magnetic disk device 1 may control a microactuator other than the microactuator applying the third MA voltage value, with a higher priority than the voice coil motor PV. The microactuator applying the third MA voltage value may be hereinafter referred to as a first MA.

Figure 4:
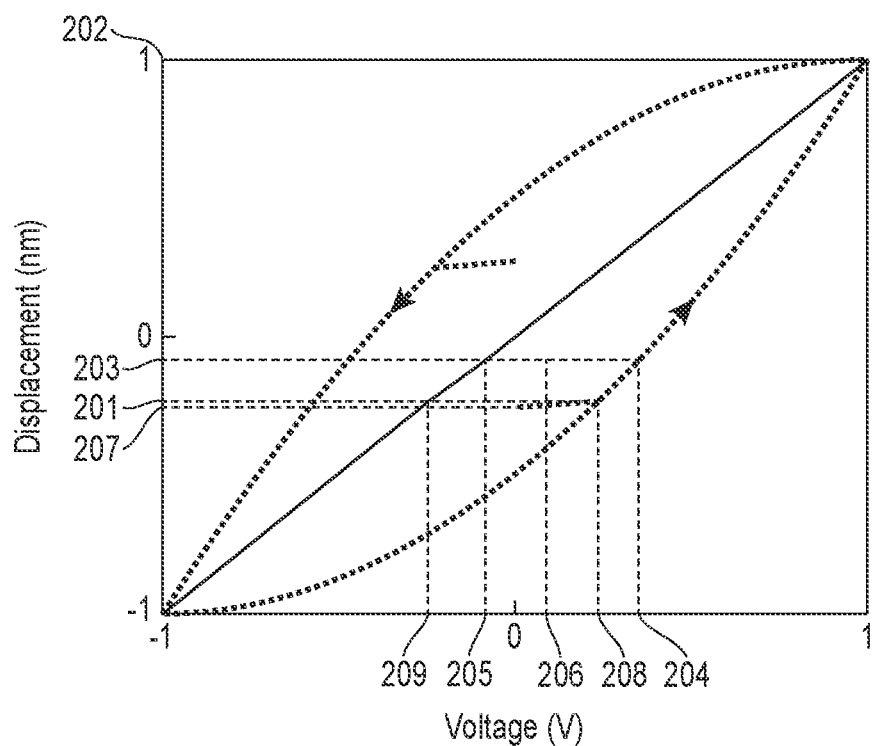
FIG. 4 is a graph showing an example of hysteresis according to the embodiment.
Figure 5:
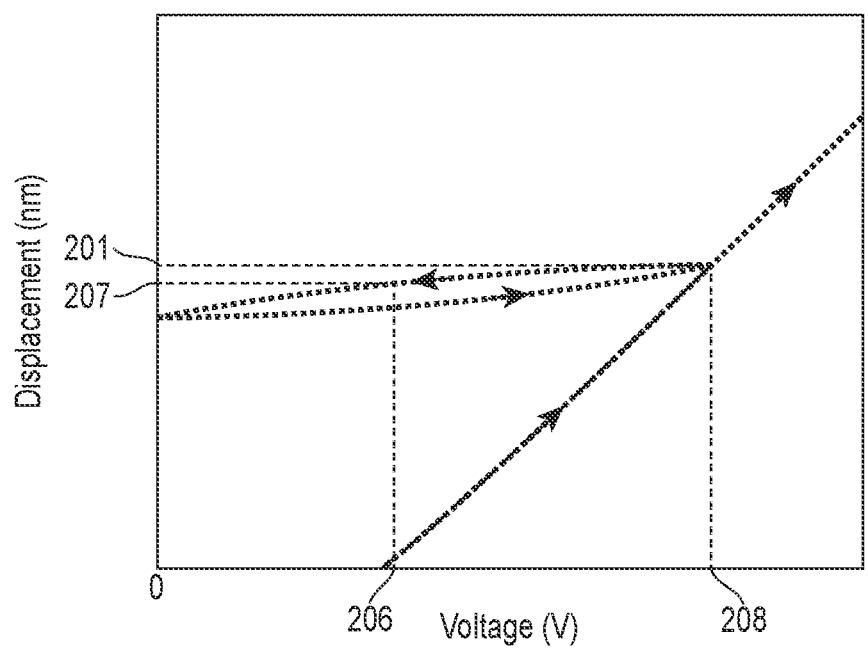
FIG. 5 is a graph magnifying a part of FIG. 4 according to the embodiment.

FIG. 4 is a graph showing an example of the hysteresis of the first microactuator PM1, and FIG. 5 is a graph enlarging a part of FIG. 4. In FIG. 4 and FIG. 5, the horizontal axis refers to the MA voltage, and the vertical axis refers to the MA displacement.

As shown in FIG. 4 and FIG. 5, when MA displacement 203 in the region from the MA displacement 201 to the MA displacement 202 where the absolute value of the second MA voltage value is higher than the absolute value of the first MA voltage value is obtained by the first MA, the necessary first MA voltage value 204 is higher than absolute value 206 of the second MA voltage value 205 corresponding to MA displacement 203. For this reason, MA voltage/displacement assignment unit 20a applies a voltage value (third voltage value) lower than or equal to the absolute value (second voltage value) 206 of the MA voltage to the first MA, and assigns to the other actuators the displacement of the difference between MA displacement 203 obtained only in the first MA and the MA displacement 207 obtained when the absolute value 206 of the MA voltage is applied to the first MA. The MA displacement 201 is a displacement at which an absolute value 208 of the first MA voltage value becomes equal to an absolute value of a second MA voltage value 209.

Figure 6:
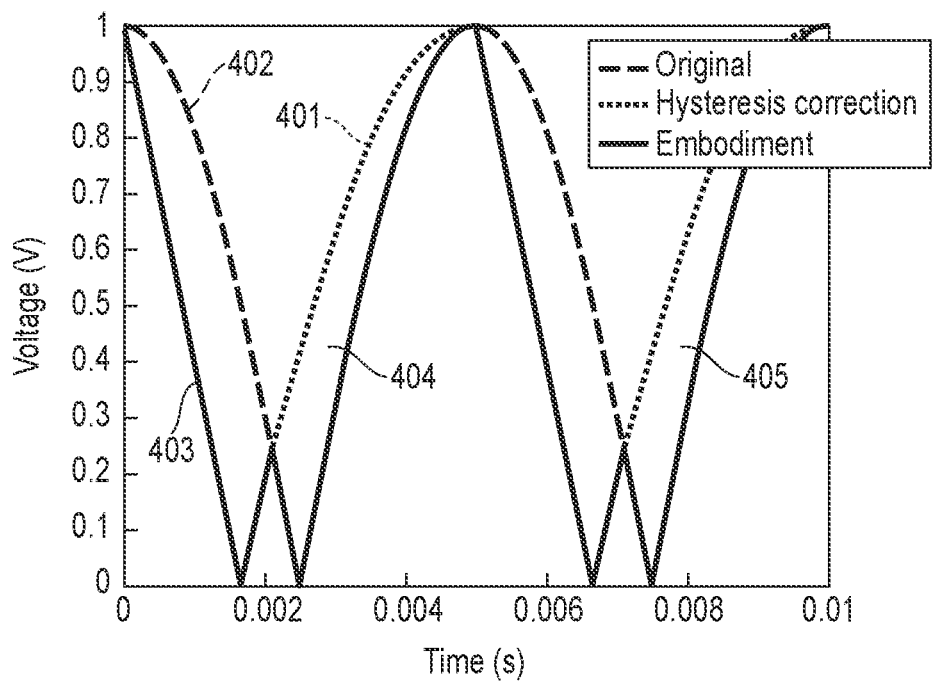
FIG. 6 is a graph showing an example of a time axis waveform of an absolute value of a microactuator (hereinafter, may be referred to as "MA") voltage value according to the embodiment.

The embodiment will be further described with reference to FIG. 6. FIG. 6 is a graph showing an example of a time axis waveform of the MA voltage value. In FIG. 6, a horizontal axis refers to time, and a vertical axis refers to an MA voltage value.

As shown in FIG. 6, an absolute value 403 having a lower absolute value, of an absolute value 401 of the first MA voltage value and an absolute value 402 of the second MA voltage value, is selected as the third MA voltage value. The effect of decreasing the MA voltage value is represented in areas 404 and 405 of the part where the absolute value 403 of the present embodiment becomes lower than the absolute value 401 of the first MA voltage value.

Figure 7:
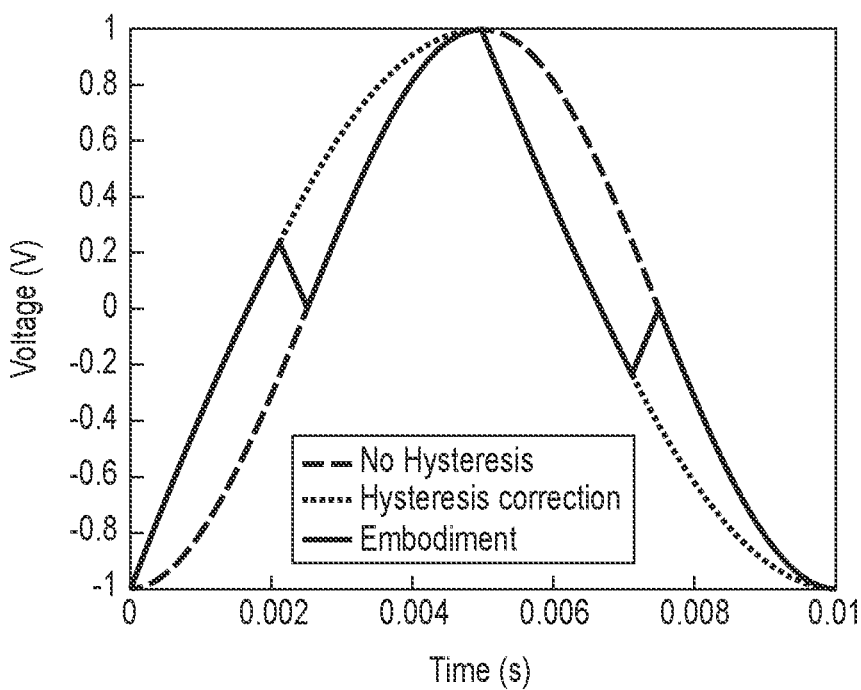
FIG. 7 is a graph showing an example of the time axis waveform when a sinusoidal voltage is applied to the microactuator according to the embodiment.

FIG. 7 is a graph showing an example of the time axis waveform when a sinusoidal voltage is applied to the microactuators PM. In FIG. 7, a horizontal axis refers to time, and a vertical axis refers to an MA voltage value.

In the present embodiment, it is shown that the voltage to the time is selected in the present embodiment by selecting the case where hysteresis compensation is not executed or the case where hysteresis compensation is executed. This selection is determined by the CPU 21, based on whether or not a difference of the absolute value of the first voltage value at which the voltage value applied to the first microactuator PM1 is corrected based on the hysteresis, and the absolute value of the second voltage value at which the voltage value applied to the microactuator is not corrected based on the hysteresis becomes positive, when the position is adjusted by the microactuators PM.

Figure 8:
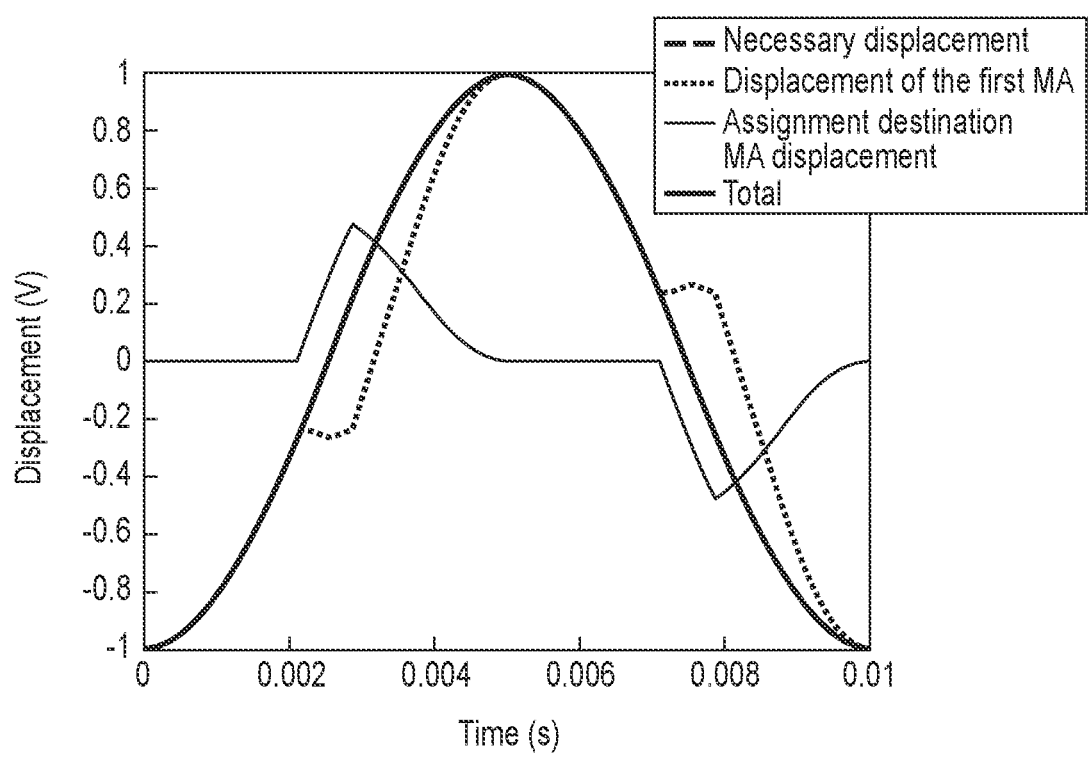
FIG. 8 is a graph showing the MA displacement when a sinusoidal voltage is applied similarly to FIG. 7 according to the embodiment.

FIG. 8 is a graph showing the MA displacement when a sinusoidal voltage is applied similarly to FIG. 7. In FIG. 8, the horizontal axis refers to time, and the vertical axis refers to displacement.

It is shown in FIG. 8 that the total displacement of the sum of a displacement of the first MA and an MA displacement of the assignment destination substantially coincides with a necessary displacement.

Figure 9:
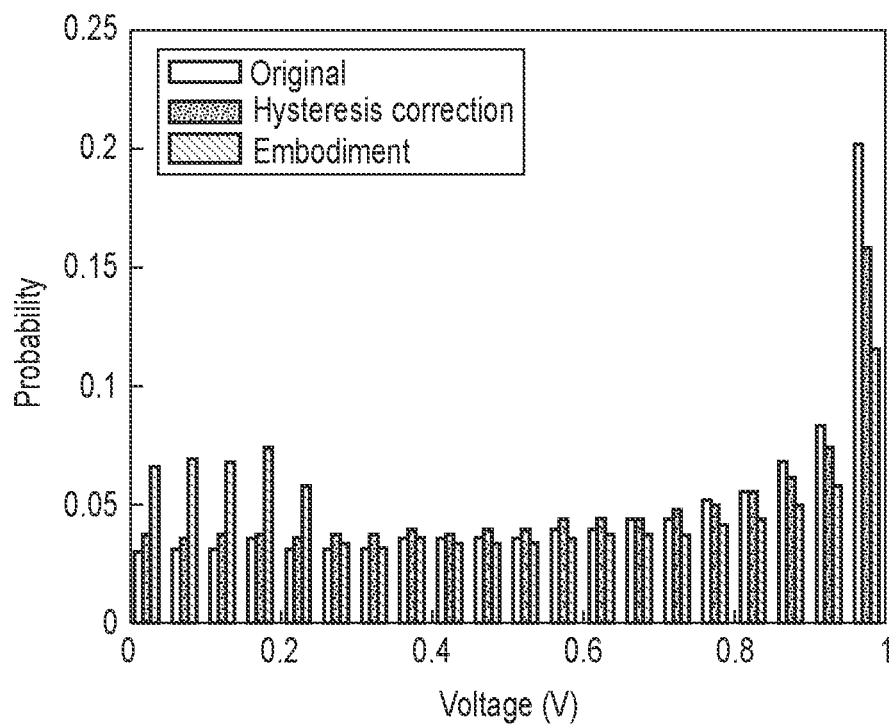
FIG. 9 is a graph showing a voltage distribution in which appearance probabilities of the voltage absolute value are compared when a sinusoidal voltage is applied similarly to FIG. 7 according to the embodiment.

FIG. 9 is a graph showing the voltage distribution in which the appearance probabilities of the voltage absolute value are compared when a sinusoidal voltage is applied similarly to FIG. 7. In FIG. 9, the horizontal axis refers to the voltage absolute value, and the vertical axis refers to the probability. The original of the FIG. 9 is the case where the correction based on the hysteresis is not executed.

As shown in FIG. 9, according to the processing of the present embodiment, it is shown that the frequency of occurrence of the MA voltage having a higher absolute value is suppressed.

Figure 10:
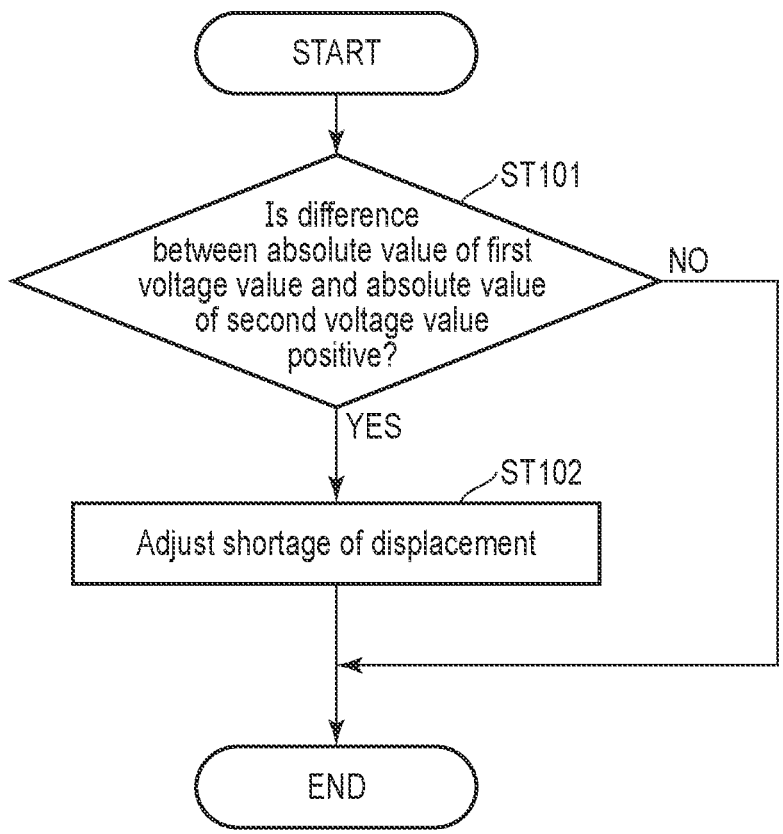
FIG. 10 is a flowchart showing an example of a process of adjusting the displacement as executed by an MA voltage/displacement assignment unit according to the embodiment.

FIG. 10 is a flowchart showing an example of a process of adjusting the displacement executed by an MA voltage/displacement assignment unit 20a. As shown in FIG. 10, the MA voltage/displacement assignment unit 20a determines whether or not the difference of the absolute value of the first voltage value at which the voltage value applied to the first microactuator PM1 is corrected based on the hysteresis and the absolute value of the second voltage value at which the voltage value applied to the microactuator PM is not corrected based on the hysteresis, is positive when adjusting the position by the microactuators PM (ST101).

When it is determined that the difference is positive (ST101: YES), the MA voltage/displacement assignment unit 20a applies the third voltage value obtained based on the second voltage value to the microactuator, and adjusts the shortage of the adjustment executed by the microactuator, by controlling at least either of the voice coil motor PV and/or the microactuator other than the microactuator that applies the third voltage value (ST102). The third voltage value is a voltage value lower than the second voltage value. Alternatively, if it is determined that the difference is not positive (ST102: NO), adjustment of the displacement is not executed.

When the difference of the absolute value of the first voltage value and the absolute value of the second voltage value is positive, the magnetic disk device configured as described above applies the third voltage value to the first microactuator PM1, and adjusts the shortage of the displacement executed by the first microactuator PM1 by controlling at least either of the voice coil motor PV and/or the microactuator other than the microactuator that applies the third voltage value. For this reason, the magnetic disk device 1 can avoid a situation where a high voltage is applied to the microactuators PM, and can prevent deterioration of the element of the microactuators PM.

It has been described that in the above embodiment, when the difference of the absolute value of the first MA voltage value and the absolute value of the second MA voltage value is determined to be positive, the third voltage value lower than the absolute value of the second MA voltage value is applied as the voltage of the first MA and the shortage of the displacement is assigned to the other actuator, but the method of applying the voltage to the first MA is not limited to this. The method of applying the voltage to the first MA may use the second MA voltage value as a predefined range, and obtain an arbitrary function in which the defined range is between the second MA voltage value and a voltage value lower than the second MA voltage value to obtain the third MA voltage value.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head;
   a voice coil motor moving the magnetic head at a predetermined position on the magnetic disk;
   a plurality of microactuators for the magnetic head, which adjusts the position of the magnetic head; and
   a control unit controlling a motion of the voice coil motor and displacements of the plurality of microactuators,
   when adjusting the position of the magnetic head by a first microactuator that is one of the plurality of microactuators, in a case where a difference of an absolute value of a first voltage value obtained by correcting a voltage value applied to the first microactuator based on hysteresis and an absolute value of a second voltage value obtained by not correcting the voltage value applied to the first microactuator based on the hysteresis is positive, the control unit applying a third voltage value obtained based on the second voltage value to the first microactuator, and adjusting shortage of the adjustment executed by the first microactuator by controlling at least one of the voice coil motor and/or a second microactuator other than the first microactuator.

2. The magnetic disk device of claim 1, wherein the third voltage value is lower than or equal to the second voltage value.

3. The magnetic disk device of claim 1, wherein the control unit converts the shortage of the adjustment into an input of the voice coil motor and adds the converted input to the voice coil motor.

4. The magnetic disk device of claim 1, wherein the control unit controls the second microactuator and the voice coil motor having room for voltage or current to be applied, of the second microactuator and the voice coil motor.

5. The magnetic disk device of claim 1, wherein the control unit adjusts the shortage of the adjustment by controlling the second microactuator with a higher priority, of the second microactuator and the voice coil motor.

6. A magnetic disk device comprising:
   a magnetic disk;
   a magnetic head;
   a voice coil motor operating the magnetic head at a predetermined position on the magnetic disk;
   a microactuator adjusting a position of the magnetic head; and
   a control unit controlling a motion of the voice coil motor and a displacement of the microactuator,
   when adjusting the position of the magnetic head by the microactuator, in a case where a difference of an absolute value of a first voltage value obtained by correcting a voltage value applied to the microactuator based on hysteresis and an absolute value of a second voltage value obtained by not correcting the voltage value applied to the microactuator based on the hysteresis is positive, the control unit applying a third voltage value obtained based on the second voltage value to the microactuator, and adjusting shortage of the adjustment executed by the microactuator by controlling the voice coil motor.

7. A method of controlling a control unit of a magnetic disk device, the magnetic disk device comprising:
   a magnetic disk;
   a magnetic head;
   a voice coil motor moving the magnetic head at a predetermined position on the magnetic disk;
   a plurality of microactuators for the magnetic head, which adjusts the position of the magnetic head; and
   the control unit controlling a motion of the voice coil motor and displacements of the plurality of microactuators,
   when adjusting the position of the magnetic head by a first microactuator that is one of the plurality of microactuators, the control unit determining whether a difference of an absolute value of a first voltage value obtained by correcting a voltage value applied to the first microactuator based on hysteresis and an absolute value of a second voltage value obtained by not correcting the voltage value applied to the first microactuator based on the hysteresis is positive and, when determining that the difference is positive, applying a third voltage value obtained based on the second voltage value to the first microactuator , and adjusting shortage of the adjustment executed by the first microactuator by controlling at least one of the voice coil motor and/or a second microactuator other than the first microactuator.

* * * * *